(12) United States Patent
Gilbert et al.

(10) Patent No.: US 11,444,848 B1
(45) Date of Patent: Sep. 13, 2022

(54) BOM GENERATION FOR COMPUTER NETWORKS

(71) Applicant: SecurEdge Networks, LLC, Charlotte, NC (US)

(72) Inventors: John P. Gilbert, Monroe, NC (US); Philip R. Wegner, Charlotte, NC (US); Michael S. McNamee, Huntersville, NC (US); Justin A. Cook, Harrisburg, NC (US); Vlad Pop, Maramures (RO)

(73) Assignee: SECUREDGE NETWORKS, LLC., Charlotte, NC (US)

( * ) Notice: Subject to any disclaimer, the term of this patent is extended or adjusted under 35 U.S.C. 154(b) by 0 days.

(21) Appl. No.: 17/191,294

(22) Filed: Mar. 3, 2021

(51) Int. Cl.
| | |
|---|---|
| *H04L 41/22* | (2022.01) |
| *G06Q 10/08* | (2012.01) |
| *H04L 41/00* | (2022.01) |
| *H04L 41/08* | (2022.01) |
| *H04L 41/50* | (2022.01) |
| *H04L 41/12* | (2022.01) |
| *H04L 41/0806* | (2022.01) |
| *G06Q 10/06* | (2012.01) |

(52) U.S. Cl.
CPC ....... *H04L 41/22* (2013.01); *G06Q 10/06313* (2013.01); *G06Q 10/0875* (2013.01); *H04L 41/0806* (2013.01); *H04L 41/0879* (2013.01); *H04L 41/0883* (2013.01); *H04L 41/12* (2013.01); *H04L 41/20* (2013.01); *H04L 41/5058* (2013.01)

(58) Field of Classification Search
CPC . H04L 41/22; H04L 41/0806; H04L 41/0883; H04L 41/12; H04L 41/20; H04L 41/5058; G06Q 10/06313; G06Q 10/0875
See application file for complete search history.

(56) References Cited

U.S. PATENT DOCUMENTS

| | | | | |
|---|---|---|---|---|
| 5,963,867 | A * | 10/1999 | Reynolds | H04W 16/18 455/446 |
| 6,819,967 | B2 | 11/2004 | Ballas et al. | |
| 7,155,713 | B1 | 12/2006 | Burkhardt et al. | |
| 7,539,495 | B2 * | 5/2009 | Kalika | H04L 41/22 455/446 |
| 7,680,644 | B2 * | 3/2010 | Rappaport | H04L 41/145 703/21 |
| 8,645,233 | B2 | 2/2014 | Srinivasan et al. | |
| 9,489,654 | B2 | 11/2016 | Martinez-Ablanedo | |
| 10,089,602 | B2 | 10/2018 | Kaiser | |
| 2004/0249770 | A1 | 12/2004 | Yeh et al. | |

(Continued)

*Primary Examiner* — Nam T Tran
(74) *Attorney, Agent, or Firm* — Tarolli, Sundheim, Covell & Tummino LLP

(57) ABSTRACT

A graphical user interface (GUI) provides data characterizing a location and expected operations of a facility for a computer network to a network bill of materials (BOM) server. The GUI can also receive map data characterizing a geographic location of the data from the network BOM server and generate, in response to the map data, a boundary selector that enables selection of a boundary for the facility in response to user input and provides facility boundary data to the network BOM server characterizing the boundary. The GUI can further receive, from the network BOM server, a network BOM that lists wireless access points (WAPs) and network switches needed for installation of the computer network and output data characterizing the network BOM.

19 Claims, 10 Drawing Sheets

(56) References Cited

U.S. PATENT DOCUMENTS

2015/0058052 A1     2/2015   Kohlhoff
2017/0374560 A1*   12/2017   Judge ...................... H04L 41/22
2018/0317095 A1*   11/2018   Rumler ................ H04W 24/10
2021/0073449 A1*    3/2021   Segev .................... G06N 5/025

* cited by examiner

200

208
[ ⊙ ] ADDRESS — 204

[         ] NO. LEVELS — 212

LEVELS EQUAL?  ☒ YES  ☐ NO — 214

[DEFAULT ▼] FACILITY PRIMARY USAGE — 216

[RANGE 1 ▼] OCCUPANCY — 220

○ APPLICATION CATEGORY 1
⋮
○ APPLICATION CATEGORY R
— 224

INTERNET ACCESS NEEDED?  ☒ YES  ☐ NO — 228

INTERNET SECURITY NEEDED?  ☒ YES  ☐ NO — 232

[ SUBMIT ] — 236

BOM GENERATION FOR COMPUTER NETWORKS

TECHNICAL FIELD

This disclosure relates to systems and methods for generating a bill of materials (BOM) for a facility.

BACKGROUND

A bill of materials (BOM) or product structure (sometimes bill of material, or associated list) is a list of the raw materials, sub-assemblies, intermediate assemblies, sub-components, parts, and the quantities of each needed to manufacture an end product. A BOM can be used for communication between manufacturing partners or confined to a single manufacturing plant. A BOM is often tied to a production order whose issuance may generate reservations for components in the BOM that are in stock and requisitions for components that are not in stock. A BOM can define products as they are designed (engineering BOM), as products are ordered (sales BOM), as they are built (manufacturing BOM), or as produces are maintained (service BOM). The different types of BOMs depend on the business need and use for which a particular BOM is intended.

In computer networking, a wireless access point (WAP), alternatively referred to more simply as an access point (AP), is a networking hardware device that allows other Wi-Fi devices to connect to a wired network. As a stand-alone device, each WAP can have a wired connection to a router, but, in a wireless router, a WAP can also be an integral component of the router itself. A WAP is differentiated from a hotspot which is a physical location where Wi-Fi access is available. A WAP connects directly to a wired local area network, typically Ethernet, and the WAP then provides wireless connections using wireless local area network (WLAN) technology, typically Wi-Fi, for other devices to use that wired connection. WAPs support the connection of multiple wireless devices through the one wired connection. There are many wireless data standards that have been introduced for wireless access point and wireless router technology. New standards have been created to accommodate the increasing need for faster wireless connections. Some wireless routers provide backward compatibility with older Wi-Fi technologies as many devices were manufactured for use with older standards.

SUMMARY

One example relates to a non-transitory machine readable medium having machine executable instructions, the machine executable instructions comprising a graphical user interface (GUI) that provides data characterizing a location and expected operations of a facility for a computer network to a network bill of materials (BOM) server. The GUI can also receive map data characterizing a geographic location of the data from the network BOM server and generate, in response to the map data, a boundary selector that enables selection of a boundary for the facility in response to user input and provides facility boundary data to the network BOM server characterizing the boundary. The GUI can further receive, from the network BOM server, a network BOM that lists wireless access points (WAPs) and network switches needed for installation of the computer network and output data characterizing the network BOM.

Another example relates to a system that includes a non-transitory machine readable medium having machine executable instructions and a processing unit that executes the machine readable instructions. The machine readable instructions include a network BOM server that receives data characterizing a location and expected operations of a facility for a computer network from an end-user device. The network BOM server can also provide map data to the end-user device characterizing a geographic location of the facility. The network BOM server receives facility boundary data characterizing geographic boundaries of the facility that is provided from the end-user device in response to the map data. The network BOM server determines a total area of the facility and generates a network BOM that lists WAPs and network switches needed for installation of the computer network. The network BOM server provides data characterizing the network BOM to the end user device.

Yet another example relates to a method for generating a bill of materials (BOM) for a computer network for a facility. The method can include receiving location information characterizing a location of the facility for the computer network. The method can also include determining a set of levels of the facility that need access to the computer network. The method can further include determining an area for each the level of the set of levels to determine a total area for the facility based on facility boundary data characterizing geographic coordinates of a boundary of the facility. The method includes calculating a number of wireless access points (WAPs) for the computer network needed to provide wireless access for devices for each level of the set number of levels based on the total area of the facility. The method can still further include determining a bandwidth needed for the computer network. The method can still further include generating a BOM for the computer network based on the number of WAPs and the bandwidth, wherein the BOM for the computer network lists hardware components for instantiating the computer network.

BRIEF DESCRIPTION OF THE DRAWINGS

FIG. 2 illustrates an example screenshot of a network menu output by a graphical user interface (GUI).

DETAILED DESCRIPTION

This disclosure relates to systems and methods for generating a bill of materials (BOM) for a computer network for a facility. The system can include a network BOM server operating on a computing platform that receives location information from an end-user device characterizing a location of a facility for a computer network. The location information can be an address or geographical coordinates of the facility (latitude and longitude coordinates). In some examples, the end-user device can be employed to complete a network menu (e.g., a fillable form) provided through a graphical user interface (GUI) at the end-user device. In such a situation, the network menu can be employed to provide the location information of the facility, the number of levels (e.g., floors) of the facility, the primary usage of the facility (e.g., residential, office space, festival, sporting events, etc.). The network menu can also be employed to provide an expected occupancy range for the facility and to select application categories (e.g., online gaming, productivity applications, video streaming, etc.) that are needed for the computer network. In other examples, other information can be provided at the network menu.

Information provided at the network menu can be provided to the network BOM server. In response to such information, the network BOM server can determine a total area for each level of the facility that needs access to the computer network. Moreover, the network BOM server can calculate a total number of wireless access points (WAPs) for the computer network needed to provide wireless access for devices for each level of the set number of levels based on the total area of the facility. Additionally, the network BOM server can calculate a number of switches needed for the computer network and calculate a bandwidth needed for the computer network. Based on these calculations, the network BOM server can generate a BOM for the computer network. The BOM for the computer network lists hardware components for physically instantiating the computer network, and this BOM can be referred to as a network BOM. Accordingly, the network BOM is employable to determine a cost associated with implementing the computer network.

Moreover, in some examples, an interactive map of the computer network can be provided at the GUI of the end-user device. In such a situation, manipulation of icons representing WAPs (WAP icons) can be distributed throughout the interactive map. Additionally, in some examples, the WAP icons can be moved or deleted. Further, in some examples, additional WAP icons can be added to the interactive map. In such examples, manipulation of the interactive map (e.g., adding or removing WAP icons) can be employed to update the network BOM.

Figure 1:
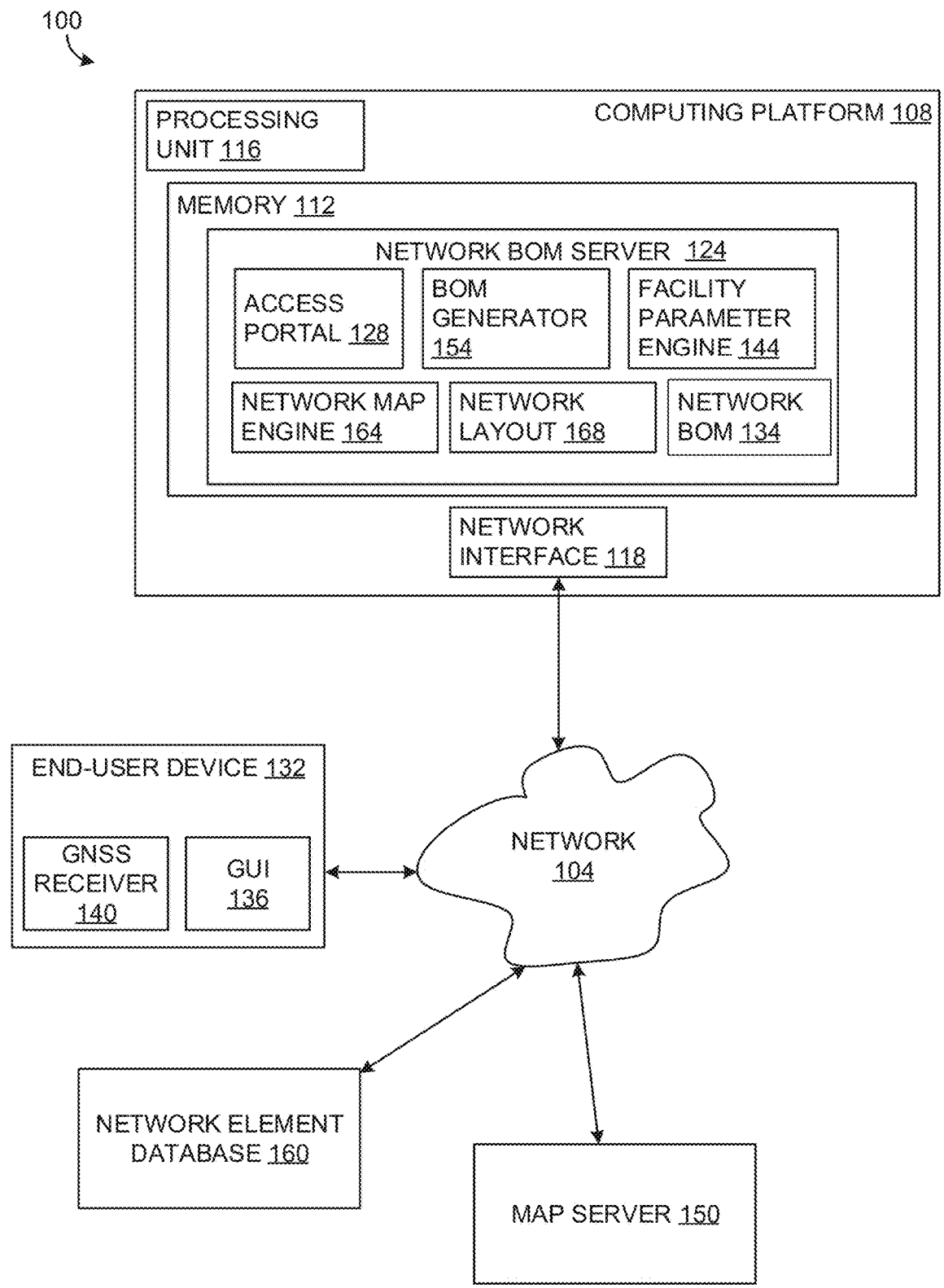
FIG. 1 illustrates an example of a system configured to generate a bill of materials (BOM) for a computer network at a facility.

FIG. 1 illustrates an example of a system 100 configured to generate a BOM for a computer network at a facility (e.g., a building, a structure or a designated area). The system 100, as illustrated, includes various computing systems (e.g., servers and devices) interconnected by a network 104. The network 104 can be implemented as any combination of a wide area network (e.g. WAN), local area network (e.g. LAN), cellular network, wireless LAN (e.g. WLAN), or any such mechanisms for enabling communication of computing systems. Portions of the network 104 can be wired or wireless. Moreover, the network 104 can be a public network, such as the Internet, a private network or a combination thereof (e.g., a virtual private network).

The system 100 can include a computing platform 108. Accordingly, the computing platform 108 can include a memory 112 for storing machined readable instructions and data and a processing unit 116 for accessing the memory 112 and executing the machine-readable instructions. The memory 112 represents a non-transitory machine-readable memory (or other medium), such as random access memory (RAM), a solid state drive, a hard disk drive or a combination thereof. The processing unit 116 can be implemented as one or more processor cores. The computing platform 108 can include a network interface 118, such as a network interface card configured to communicate with other nodes of the system 100 via the network 104.

The computing platform 108 could be implemented in a computing cloud. In such a situation, features of the computing platform 108, such as the processing unit 116, the network interface 118, and the memory 112 could be representative of a single instance of hardware or multiple instances of hardware with applications executing across the multiple of instances (i.e., distributed) of hardware (e.g., computers, routers, memory, processors, or a combination thereof). Alternatively, the computing platform 108 could be implemented on a single dedicated server or workstation. Furthermore, in some examples the computing platform 108 can be employed to implement other nodes of the system 100 in a similar manner. However, for purposes of simplification of explanation, only the details of the computing platform 108 are illustrated.

The memory 112 can include a network BOM server 124. The network BOM server 124 can include operations for a web server or a server for a dedicated client. More specifically, the network BOM server 124 can include an access portal 128. The access portal 128 can provide an interface for facilitating communication on the network 104. As some examples, the access portal 128 can provide a web portal for an end-user device 132.

The end-user device 132 can represent one of a variety of computing devices (e.g., a desktop computer, a laptop computer, a smart phone, a tablet computer, etc.) having hardware (e.g., a processing unit and a non-transitory memory) and software (e.g. a web browser application or a dedicated client) capable of processing and displaying information (e.g., web pages, a graphical user interface, etc.), and communicating information (e.g., web page request, user activity, etc.) over the network 104. The end-user device 132 includes a graphical user interface (GUI) 136 that can be representative of the web browser application and/or a dedicated client employed to communicate with the network BOM server 124 via the access portal 128.

In some examples, the end-user device 132 can also include a global navigation satellite system (GNSS) receiver 140, such as a global positioning system (GPS) receiver or a GLONASS receiver, a BeiDou Navigation Satellite System (BDS) receive and/or and a Galileo receiver. In such a situation, the GNSS receiver 140 is employable to determine location information (e.g., latitude and longitude coordinates) for the end-user device 132.

The network BOM server 124 and the end-user device 132 can operate in concert to generate a network BOM 134 for the facility based on user input provided at the GUI 136. As used herein, the term "network BOM" refers to a BOM for a computer network that includes a list of components for physically instantiating the computer network. As some examples, the facility can be a building, such as an office building or a residence. In other examples, the facility can be a structure such as a sports stadium. In still other examples, the facility can be a designated outdoor area for an event (e.g., a fairground). This list is not meant to be exhaustive. In fact, the facility can be any area or structure in which a user desires to implement a computer network.

A user of the end-user device 132 can employ the GUI 136 to provide data characterizing the facility and operations that are expected in the facility, and this data is employable to generate the network BOM 134 for the facility. FIG. 2 illustrates an example screenshot of a network menu 200 that can be output by a GUI (e.g., the GUI 136) that could be provided by the end-user device 132 to provide the data characterizing the facility and expected operations of the facility to a network BOM server (e.g., the network BOM server 124 of FIG. 1).

The network menu 200 requests information regarding the network that is desired. More particularly, the network menu 200 includes user controls (e.g., text boxes, radio buttons, drop-down menus, etc.) for providing data characterizing the facility and the expected operations at the facility. In other examples, other types of user controls (e.g., sliding bars) are employable. More particularly, the network menu 200 includes a location text box 204. The location text box 204, labeled "ADDRESS" provides a text box for entering a location of the facility, such as a street address (or more simply referred to as an address). Additionally, in the example illustrated, the location text box 204 includes a location icon 208. Actuation of the location icon 208 (e.g. by clicking or pressing the location icon 208) causes the end-user device to retrieve location information (e.g., latitude and longitude coordinates) from a GNSS receiver (e.g., the GNSS receiver 140). In this manner, the location information can be provided to the network BOM server automatically. The location icon 208 may be activated in examples where the end-user device is located at the facility.

The network menu 200 also includes a levels text box 212. The levels text box 212, labeled "LEVELS" allows entry of an integer representing a number of levels (e.g., floors) of the facility that need access to the network. In some examples, the number of levels for the facility provided in the levels text box 212 can be a subset of an overall number of levels in the facility. For instance, consider a situation where the facility represents a high-rise office building (e.g., 15 or more floors), and it is desired to provide a computer network in a certain subset of the floors (e.g., levels 4-7). Thus, as used herein, unless otherwise noted the "number of levels" of the facility refer to levels of the facility that need access to the computer network, which may be different from (or the same as) the total number of levels at the facility. As an alternative, the number of levels of the facility can be referred to as a set of levels of the facility.

The network menu 200 also includes a primary usage selection field 216. The primary usage selection field 216 (labeled "FACILITY PRIMARY USAGE") includes a drop-down menu that allows selection of a primary usage of the facility. The actions of the primary usage selection field 216 can include, for example residential, office, education, festival, sporting event, entertainment, etc. The primary usage of the facility can be a factor in an amount of bandwidth needed for the computer network at the facility. For instance, the bandwidth needed at a festival may be lower than a band with needed at a residential facility. It is noted that the primary usage may not be the only usage of the facility. For instance, in a facility implemented as an office building, a loading dock might be present, but the majority of the facility is considered office space.

The network menu 200 can further include an occupancy range selection field 220. The occupancy range selection field 220 (labeled "OCCUPANCY") includes a drop-down menu that allows selection of an expected occupancy range of a number of users at one time for the computer network. The occupancy range can be based, for example on a fire capacity of the facility, a number of employees at the facility, a number of registered members of the facility (e.g. residents or ticketholders), etc. Moreover, although the network menu 200 provides a drop-down menu, in other examples a sliding bar or a text box can be implemented.

The network menu 200 further includes R number of application category radio buttons 224, where R is an integer greater than or equal to one. The R number of application category radio buttons 224 can each correspond to a particular application category (labeled "APPLICATION CATEGORY 1 . . . APPLICATION CATEGORY R). Each of the R number of application categories can define types of applications that are expected to be in common usage on the computer network of the facility. The application categories can include, for example streaming (e.g. video streaming for entertainment and/or videoconferencing), audio-based applications (e.g., voice over IP (VoIP) applications), office applications (e.g., productivity based applications), social media, online gaming, etc. Selection of one or more of the application categories can impact the amount of bandwidth needed for the computer network and/or the type of network infrastructure needed (e.g., low latency equipment for online gaming).

The network menu 200 also includes an Internet access checkbox 228. The Internet access checkbox includes a YES and NO checkbox. Selecting the YES checkbox of the Internet Access checkbox 228 indicates that an Internet connection is needed for the computer network at the facility. Conversely, selecting the NO checkbox of the Internet Access checkbox 228 indicates that no Internet access is needed, such as a situation where an existing Internet connection already exists at the facility. The network menu 200 also includes an Internet security checkbox 232. The Internet security checkbox includes a YES and NO checkbox. Selecting the YES checkbox of the Internet security checkbox 232 indicates that an Internet security control device (e.g., a firewall) is needed for the computer network. Conversely, selecting the NO checkbox of the Internet security checkbox 232 indicates that no Internet security device is needed, such as a situation where an existing firewall already exists at the facility or a situation where end-users may provide additional security (e.g., in a residential facility).

The network menu 200 further includes a submit button 236 (e.g. a virtual button). Actuation of the submit button 236 causes the end-user device that is outputting the network menu 200 to submit data provided in the network menu 200 to the network BOM server.

Referring back to FIG. 1, the network BOM server 124 can receive the user input (e.g., corresponding to the data provided to the network menu 200 of FIG. 2) at the access portal 128 characterizing the facility and the expected operations at the facility. The data characterizing the facility can be provided to a facility parameter engine 144 of the network BOM server 124.

The facility parameter engine 144 can be configured to determine physical parameters of the facility that will house the computer network based on a portion of the data characterizing the facility. To determine the physical parameters of the facility, the facility parameter engine 144 can extract the location information from the data and provide map data to the GUI 136 characterizing a geographic region that includes the location information. In some examples, the facility parameter engine 144 can employ the access portal 128 to query a map server 150 for the map data based on the location information (e.g., an address or latitude and longitude coordinates). Responsive to the query, the map server 150 can provide the map data to the access portal 128, and this map data can be provided to the GUI 136. As one example, the map data can characterize a graphical representation of the Earth centered around the location identified in the location information for the facility. That is, the graphical representation characterized by the map data includes the facility. The GUI 136 can output a boundary selector screen that includes the graphical representation of the map data, and provides an interface that allows user input to select boundaries of the facility.

Figure 3A:
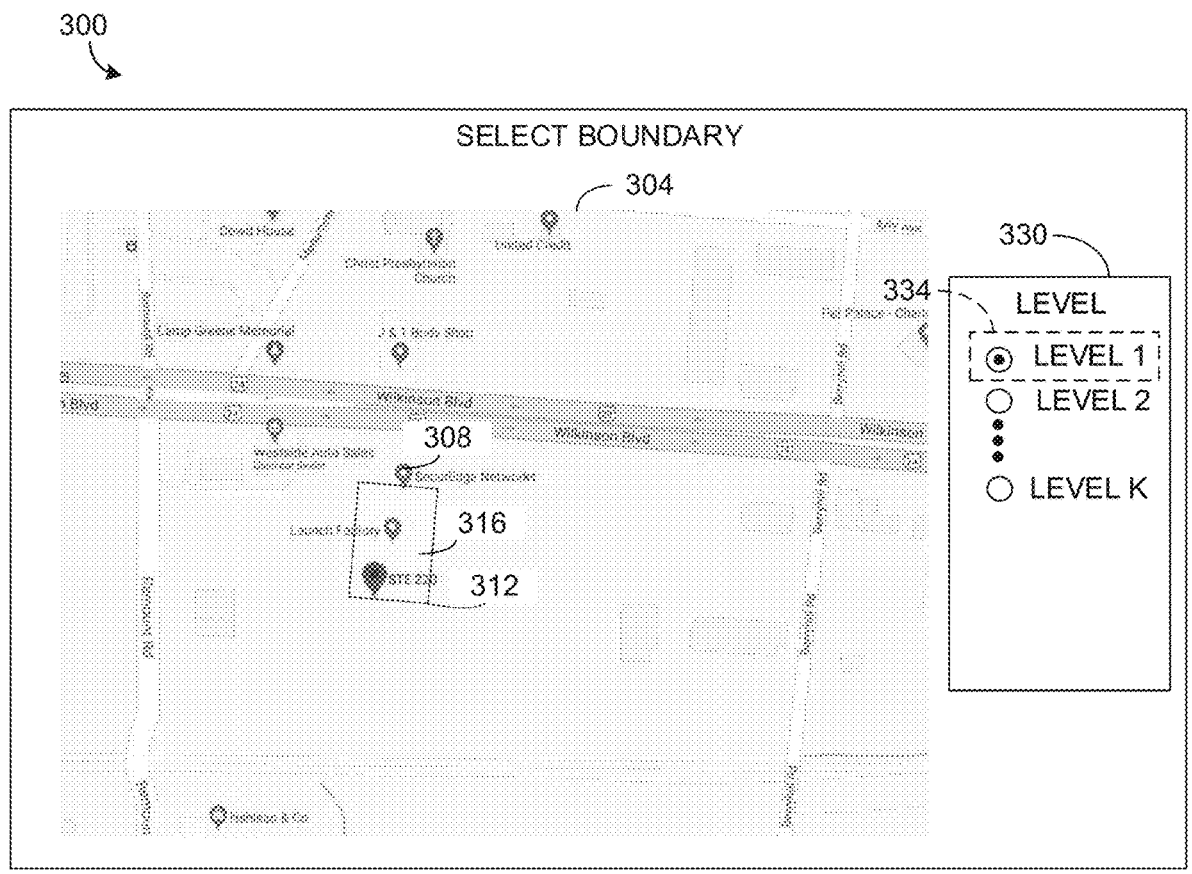
FIG. 3A illustrates an example screenshot of a boundary selector that can be output by a GUI to select a boundary of a facility.
Figure 3B:
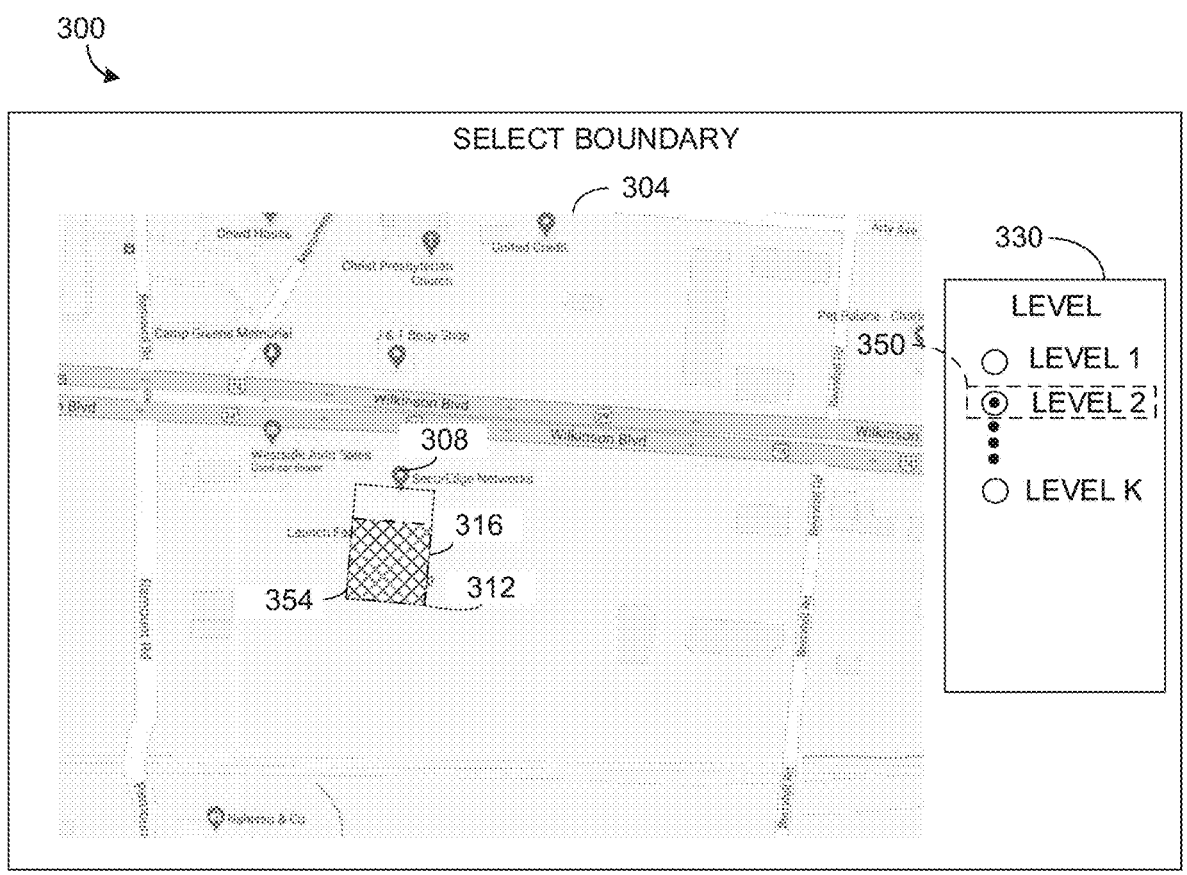
FIG. 3B illustrates an example screenshot of a boundary selector that can be output by a GUI to select a boundary for an individual level of a facility.

FIGS. 3A and 3B illustrate an example of screenshots of a boundary selector 300 that can be output by a GUI (e.g., the GUI 136 of FIG. 1) of an end-user device (e.g., the end-user device 132 of FIG. 1) to enable selection of a boundary of the facility for which the network BOM 134 of FIG. 1 is generated. As noted, the boundary selector 300 is provided after a location of the facility has been provided, and the map data has been returned. The boundary selector 300 illustrates a graphical map 304 centered about a particular address 308 (e.g., provided in the location text box 204 of FIG. 2).

The boundary selector 300 enables user input to select a boundary of the facility. In the present example, a boundary 312 circumscribes the facility 316. The boundary 312 can be selected, for example, with click-by-click operations to define individual legs of the boundary 312 or by a single click of a location within the facility 316. Although the boundary 312 is illustrated as being rectangular, in other examples, other polygon shapes can be implemented. In some examples, the boundary selector 300 output by the GUI can record geographical coordinates of each leg of the boundary 312 and return those geographic coordinates to the network BOM server as facility boundary data. As some examples, the geographical coordinates of the boundary 312 can be provided to the network BOM server in the extensible markup language (XML) format or the GeoJSON (Geo-JavaScript Object Notation) format.

Additionally, in examples where one or more levels of the number of levels has a different area (e.g., the NO checkbox of the levels equal check box 214 of FIG. 2 is checked), the boundary selector 300 can include a level selection box 330 that allows the selection between the K number of levels (floors) of the facility, where K is specified in the levels text box 212 of FIG. 2. As indicated by the box 334, in FIG. 3A, level 1 has been selected for the example provided.

In situations where an individual level (or multiple levels) of the K number of levels has a different area, the selection of the levels can be changed. In FIG. 3B, it is presumed that the level has been changed in the level selection box 330 to level 2, as indicated by the box 350. In the screenshot of FIG. 3B, the boundary selector 300 provides the graphical map 304, that includes the boundary 312 selected for level 1. Additionally, the graphical map 304 includes a second boundary 354 (selected in response to user input) that defines the boundary for level 2 in the present example. As illustrated, the second boundary 354 covers a smaller area than the boundary 312 for level 1, but in other examples, the second boundary 354 could be larger and/or a different shape than the boundary 312 of level 1.

Selection of different areas for different levels may be useful in situations where only part of a level needs access to the computer network (e.g., a portion of one level is a parking garage or is leased by an unrelated tenant). In this situation, level boundary data that includes the geographical coordinates of the second boundary 354 can also be provided to the network BOM server. Moreover, in a similar manner, the boundary selector 300 can be employed to select boundaries and provide level boundary data for other levels of the facility, or some subset thereof. Accordingly, level boundary data can define a variance of the facility boundary data for a corresponding level.

Referring back to FIG. 1, in response to the facility boundary data, the facility parameter engine 144 can query the map server 150 for an area (e.g., in square meters) circumscribed by the boundary of the facility. This area can be referred to as a rooftop area. Additionally, in some examples, the facility parameter engine 144 can query the map server 150 for the area of levels defined in level boundary data (if provided). In a given example (hereinafter, "the given example"), it is presumed that the area defined in the boundary of facility is 2415 square meters.

In some examples, the area circumscribed by the boundary can be multiplied by the number of levels provided in the levels text box 212 of FIG. 2 to determine the total area for the facility. For example, if the YES box of the levels equal check box 214 of FIG. 2 was checked, the facility parameter engine 144 can presumed that each of the levels has approximately the same area. As illustrated in FIG. 3B, if the NO box of the levels equal check box 214 is checked, the boundary selector 300 of FIGS. 3A and 3B enables adjustment of the area for individual levels. In other examples, the adjustment can be, for example, providing user input that defines a percentage of area relative to the boundary 312 selected in FIG. 3A. The facility parameter engine 144 can be configured/programmed to presume that if level boundary data is not provided for a given level, that the given level has the same area as the area defined in the facility boundary data (e.g., the rooftop area).

In any such situation, the facility parameter engine 144 can calculate the area of each level of the facility and sum the total to get the total area for the computer network. In the given example, it is presumed that each level is equal, and that there are three (3) levels, such that the facility parameter engine 144 calculates a total area for the computer network to be 7,245 square meters (2415+2415+2415), which is equivalent to multiplying the rooftop area by the number of levels of the facility.

Data characterizing the area of the facility for the computer network can be provided to a BOM generator 154 of the network BOM server 124. Responsive to the data characterizing the area of the facility, the BOM generator 154 can be configured/programmed to generate the network BOM 134 characterizing components needed to physically instantiate the computer network. The BOM generator 154 can extract the primary usage of the facility from the data characterizing the expected operations of the facility. For instance, data corresponding to the primary usage provided in the primary usage selection field 216 can be extracted. In situations where no primary usage is selected, a default primary usage (e.g., an office) can be selected. Moreover, continuing with the given example, it is also presumed that an office has been selected as the primary usage of the facility. This information can be added to a list of network specifications.

The BOM generator 154 can be configured with (editable) predetermined parameters for each selectable primary usage. Such predetermined parameters can include, for example, a base number of square meters per wireless access points (WAPs) for the computer network. The base number of square meters per WAP can be based, for example, on experimental data and on a protocol used by each such WAP. For example, if each WAP is designated as a WAP conforming to the IEEE 802.11ac-2013 or 802.11ac standard (Wi-Fi 5 standard), the based number of square meters per WAP would be lower than if each WAP conforms to the IEEE 802.11ax (Wi-Fi 6) standard. Similarly, the predetermined parameters can specify a base number of switches per square meter for each selectable primary usage. Moreover, the base number of switches per square meter can vary based on experimental data and/or the protocol employed by each such switch and WAP. This information can be added to the network specifications. In the given example, it is presumed that there is 1 WAP per 325.16 square meters and that there is 1 switch per 1858 square meters.

In some examples, the predetermined parameters can specify a predicted average number of devices per occupant for communication on the computer for each selectable primary usage. For instance, if the primary usage is a festival or sporting event, the predetermined parameters may specify that each occupant is predicted to have one (1) device that will communicate on the computer network (e.g., a smart phone). Conversely, if the primary usage is an office space, the predetermined parameters may specify that each occupant is predicted to have two devices per occupant (e.g., a smart phone and a tablet computer). The data characterizing the expected operations of the facility can include an occupancy range selected from the drop down menu of the occupancy range selection field 220 of FIG. 2. Thus, the BOM generator 154 can multiply the expected number of devices (for communication on the computer network) per occupant by a value for the occupancy range selected. In various examples, the value for the occupancy range can be for example, a value of central tendency of the occupancy range (e.g., an arithmetic mean) or an edge of the occupancy range. This information can be added to the network specifications. Continuing with the given example, it can be presumed that there is predicted to be an average of two devices per occupant accessing the computer network and that there is a range of 40-60 occupants (e.g., arithmetic mean of 50 occupants) in the facility. Thus, in the given example, the BOM generator 154 can calculate that the computer network will need to support 100 concurrently communicating devices (2×50). This information can be added to the network specifications.

In some examples, the predetermined parameters can specify a predicted ceiling height and ceiling type that corresponds to each selectable primary usage for the facility. In the given example, it is presumed that an office facility has a ceiling height of 3.048 meters, and the ceiling type is presumed to be drop ceiling. This information can be added to the network specifications.

Furthermore, the BOM generator 154 can extract data related to the Internet access checkbox 228 of FIG. 2 and the Internet security checkbox 232 of FIG. 2 to determine if the network BOM 134 for the computer network should include respective Internet access and/or Internet security appliances (e.g., a firewall). In examples where Internet access is needed, the BOM generator 154 can calculate a bandwidth needed for the computer network based on the occupancy, the primary usage and the application categories selected. In the given example, it is presumed that the network for the facility needs both Internet access and a firewall. This information can be added to the network specifications.

The BOM generator 154 can aggregate the data extracted and calculated for the facility to determine the number of network sensors needed. Additionally, the number of WAPs can be adjusted to accommodate a captive portal (e.g., a guest) and/or the selected application categories from the R number of application category radio buttons 224 of FIG. 2. Additionally, the BOM generator 154 can examine the type of application categories selected to determine if special/ additional equipment is needed to provide specific levels of performance. For instance, if online gaming is selected as an application category, the BOM generator 154 can add low latency to the network specifications. In the given example, it can be presumed that no additional WAPs are needed, and that there needs to be 1 network sensor for every 8 WAPs of the computer network.

After determining the network specifications, the BOM generator 154 can employ the access portal 128 to query a network element database 160 (or other data structure) for model numbers and costs associated with equipment needed to physically instantiate the computer network. The network element database 160 can include records characterizing individual hardware devices and performance characteristics of each such hardware device. Such hardware devices can include, but are not limited to specific models of WAPs, switches, firewalls, etc. Moreover, the network element database 160 can include records related to software licensing for the hardware devices (e.g., software for the firewalls) and/or network performance monitoring software. Further, the network element database 160 can include data characterizing Internet accessing licensing with Internet Service Providers (ISPs), such as available bandwidth and/or costs.

The BOM generator 154 can parse through the network element database 160 to retrieve the records of hardware devices, software and/or Internet access agreements to generate the network BOM 134. The resultant network BOM 134 can include a list of hardware devices, software licenses and/or Internet access for the computer network that meets or exceeds the network specifications. In some examples, the network BOM 134 can also include a cost of each such component.

Figure 4:
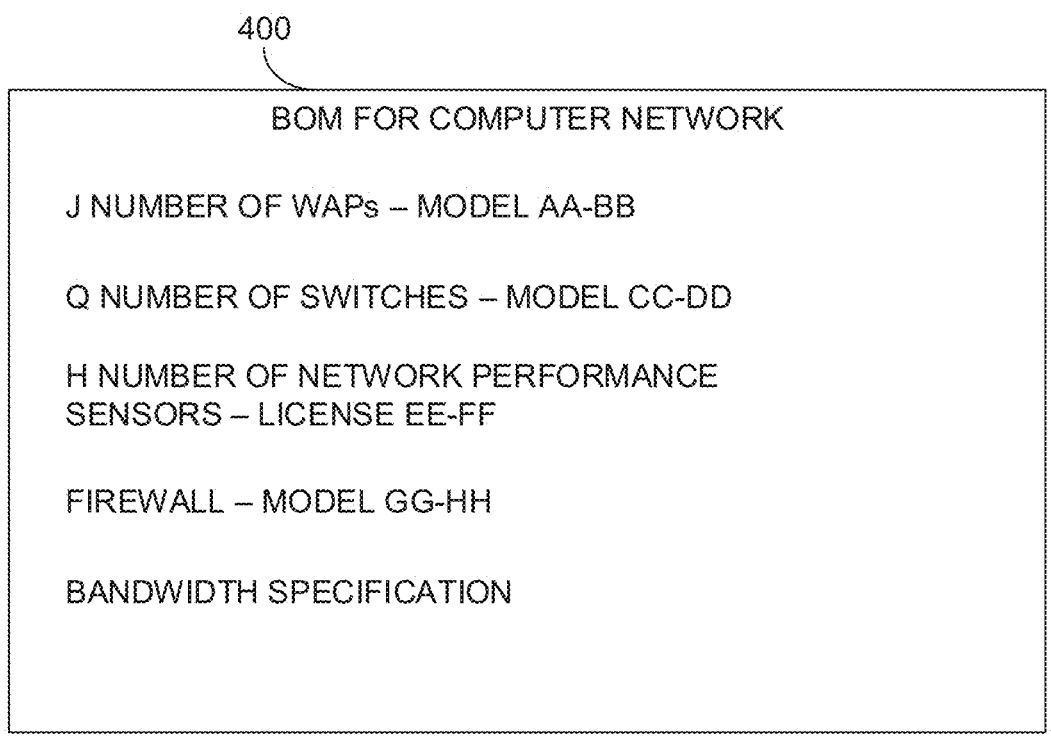
FIG. 4 illustrates an example of a BOM generated by a BOM generator.

FIG. 4 illustrates an example of a BOM 400 that can be generated by a BOM generator (e.g., the BOM generator 154 of FIG. 1). The BOM 400 lists J number of WAPs of a specific model number ("AA-BB"), where J is an integer greater than or equal to one. The BOM 400 lists Q number of switches of a specific model number ("CC-DD"), where Q is an integer greater than or equal to one. The BOM 400 lists H of network performance sensors with a specific software license ("EE-FF"). The BOM 400 lists a firewall of a specific model number ("GG-HH"). The BOM 400 further includes a bandwidth specification, which can identify an ISP agreement with a list of an amount of Internet bandwidth. In other examples, the BOM, including the BOM 400 can also include cost information for each of item on the list and/or a total cost.

Referring back to FIG. 1, the network BOM 134 can be provided to the end-user device 132 through the access portal 128. In response to receipt of the network BOM 134, the GUI 136 of the end-user device 132 can output data characterizing the network BOM 134. In some examples, the output of the GUI 136 can be similar to the BOM 400 of FIG. 4.

Additionally, in some examples, the network BOM server 124 can include a network map engine 164 that receives the network BOM 134. The network map engine 164 can employ the network BOM 134 to provide network map data for generating an interactive map at the GUI 136 of a proposed computer network based on the network BOM 134, and the data characterizing the facility and the expected operations of the facility.

More specifically, the network map engine 164 can analyze the boundary for the facility (e.g., the boundary 312 of FIG. 3) and generate data for placing icons representing WAPs throughout each level of the facility, and this data can be included in the network map data provided to the GUI 136. Moreover, the GUI 136 can employ the network map data to generate an interactive map. The interactive map enables movement of the icons representing the WAPs to change the number of WAPs on each floor. Data characterizing this user interaction can be provided to the network map engine 164, which can update the network BOM 134 to reflect the changes (e.g., add or remove WAPs from the network BOM 134).

Figure 5A:
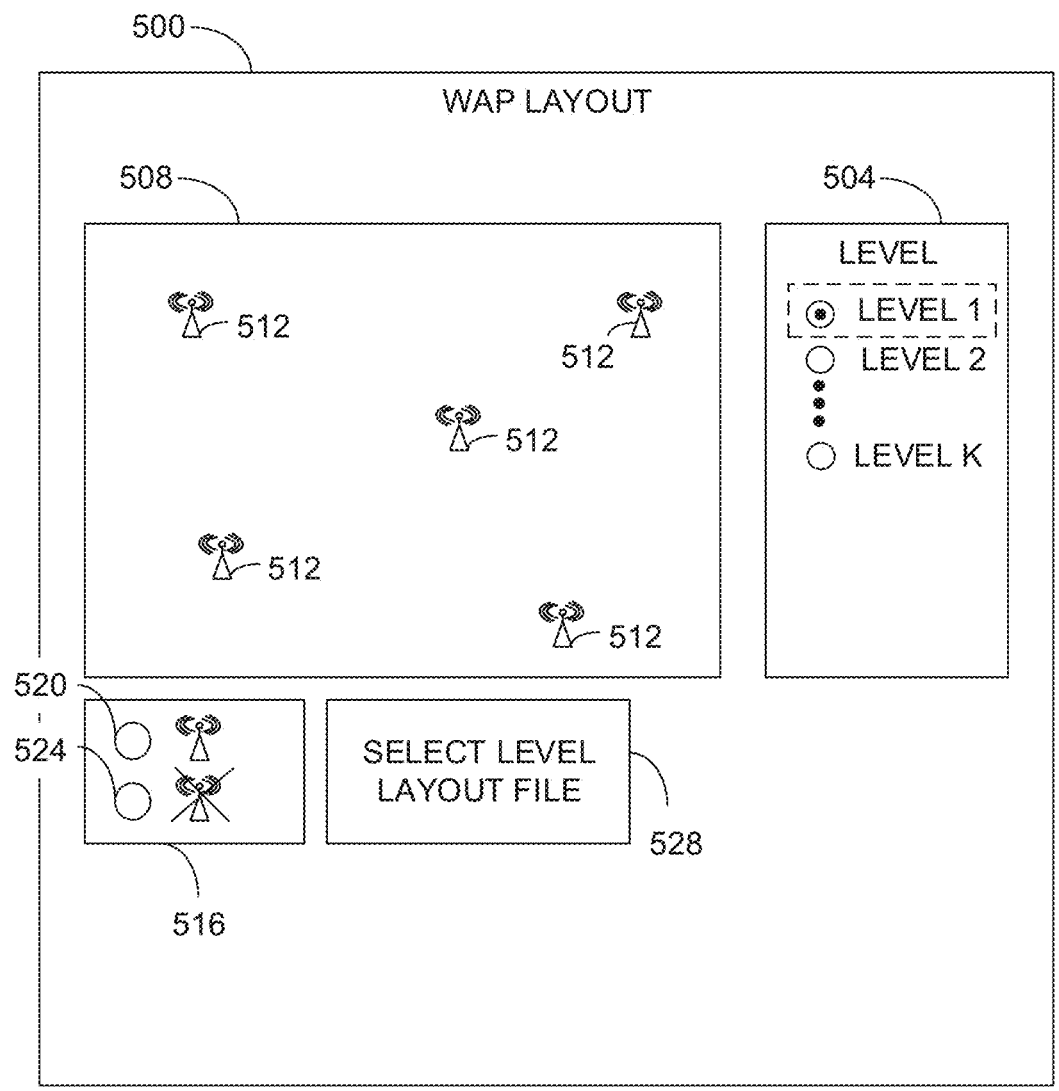
FIG. 5A illustrates an example screenshot of an interactive map.
Figure 5B:
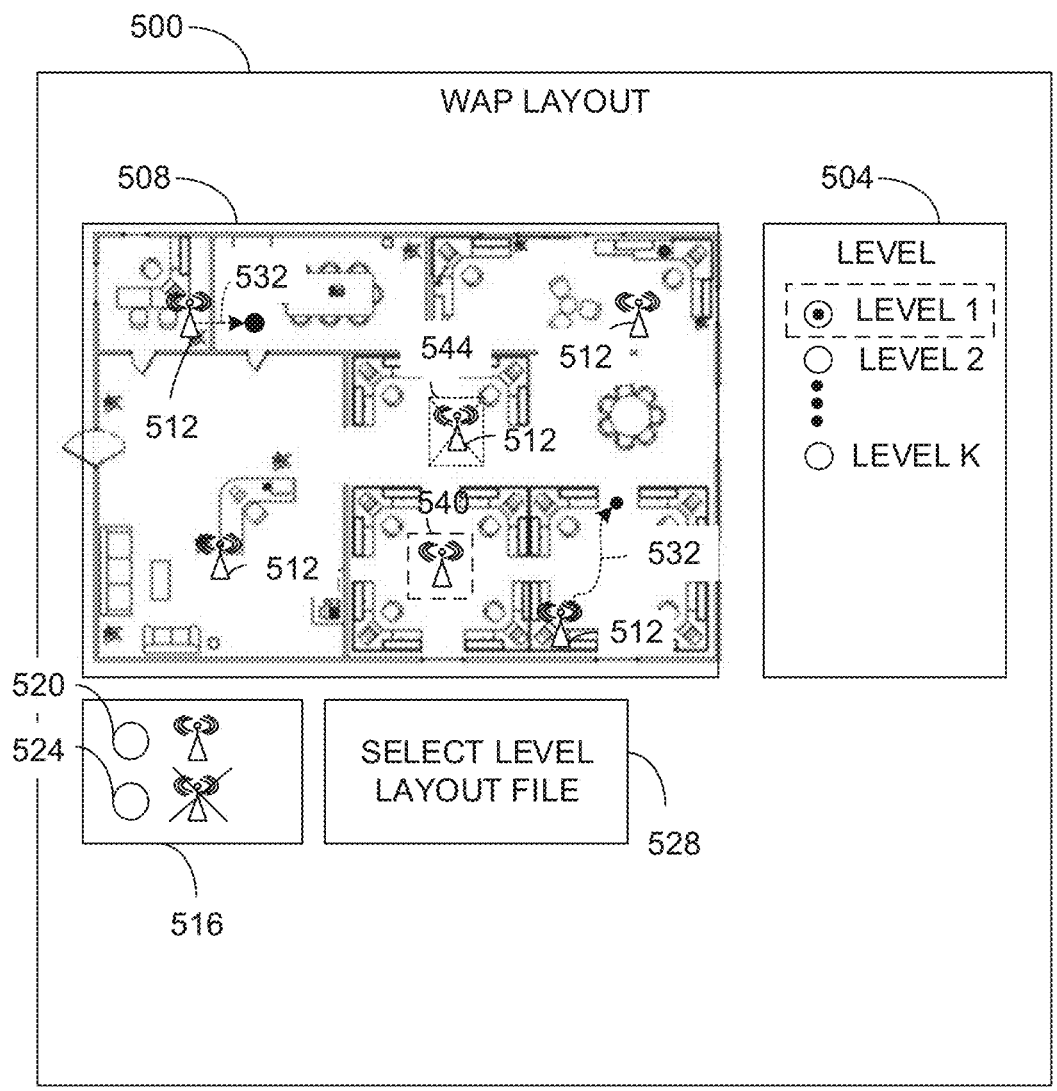
FIG. 5B illustrates an example of another screenshot of an interactive map.

FIGS. 5A and 5B illustrate example screenshots of an interactive map 500 for a facility that depicts proposed locations of WAPs in the facility. The interactive map 500 can be output by a GUI, such as the GUI 136 of FIG. 1.

The interactive map 500 of FIGS. 5A and 5B includes a level selection box 504 that allows the selection between the K number of levels (floors) of the facility, where K is specified in the levels text box 212 of FIG. 1. The interactive map 500 also includes a level map 508 that has boundaries corresponding to the boundary 312 selected in FIG. 3 for the facility or the boundary 554 corresponding to the shape of an individual selected level. Thus, the shape of the level map 508 corresponds to the shape of the boundary 312 of FIG. 3A or the boundary 554 of FIG. 3B if level boundary data is generated for the selected level. Moreover, the user input at the level selection box 504 changes the level map 508.

The level map 508 includes icons 512 that represent proposed locations of WAPs for the level represented on the level map 508, which are referred to as WAP icons 512. The number of WAPs represented by the WAP icons 512 corresponds to the number of WAPs (divided by the number of levels selected) in the network BOM (e.g., the network BOM 134 of FIG. 1). Accordingly, the interactive map 500 provides proposed positions of the WAPs throughout the facility (through the WAP icons 512). The interactive map 500 includes WAP controls 516. The WAP adjustment controls includes a WAP addition radio button 520 and a WAP removal radio button 524. Selection of the WAP addition radio button 520 allows additional WAP icons 512 to be added to the level map 508. Selection of the WAP removal radio button 524 allows selection and removal of particular WAP icons 512 from the level map 508.

Further, the interactive map includes a level layout file selection button 528. Actuation of the level layout file selection button 528 enables selection of a particular image file that represents a proposed layout of the level selected in the level selection box 504. In various examples, the image file can be any format (e.g., a Joint Photographic Experts Group (JPEG) file, a Computer Aided Drafting (CAD) file, a Portable Graphics Network (PNG) file, etc.).

FIG. 5B illustrates an example of the interactive map 500, wherein a layout file for a first level (LEVEL 1) has been selected. The layout file is displayed on the level map 508, underlying the WAP icons 512. The interactive map 500 can allow user input to change a position of the WAP icons 512. In the example illustrated, dotted lines 532 represent proposed changes to the locations of the WAP icons 512.

Additionally, in the example illustrated in FIG. 5A, a particular WAP icon 540 has been added, and another particular instance of the WAP icon 544 has been removed (through selection of the respective WAP addition radio button 520 and the WAP removal radio button 524). These user interactions represent the respective adding and removing of WAPs on the level represented in the level map 508. For instance, in an example where the selected level has a loading dock (that may be included in the image file of the level), WAP icons 512 over this area may be removed. In such a situation, WAP icons 512 can be added to another level in an area with a large amount of expected traffic, such as the WAP icon 540, which has been added.

In this manner the interactive map 500 can be employed to make adjustments to the number of WAPs proposed in the network BOM for each level of the facility, or some subset thereof. Stated differently, the interactive map 500 for the facility that depicts proposed locations of WAPs (as the WAP icons 512) in the facility, enables user input to change a location of the WAPs and a number of the WAPs in the facility. Referring back to FIG. 1, data characterizing user interactions (e.g., user input) in the interactive map provided by the GUI 136, including the addition and/or removal of WAPs can be provided to the network map engine 164 (e.g., through the access portal 128). Additionally, in some examples, such data characterizing the user interactions can include layout files (e.g., image files) selected and/or suggested locations for WAPs. In response, the network map engine 164 can generate a network layout 168 that characterizes a proposed layout of WAPs for each level of the facility (or some subset thereof). Additionally, the network map engine 164 can update the network BOM 134 to reflect the user interactions, such as adding or removing a number of WAPs from the network BOM 134. The updated network BOM 134 can be provided to the GUI 136 of the end-user device 132 via the access portal 128.

By employing the system 100, the network BOM 134 can be quickly generated and can be tailored for the specific needs and expected operations of the facility. More particularly, the system 100 relieves a user of the end-user device 132 from knowing much information about the facility and/or knowing much information about information technology (IT). Instead, such a user would only need to know things that should be immediately apparent about the facility that is to be refurnished or erected (e.g., the location, the number of levels, the expected occupancy, the primary usage, the category of expected applications being used, etc.).

Further, as illustrated in FIGS. 5A and 5B, the GUI 136 enables further refinement of the network BOM 134 in situations where a layout (e.g., in a layout file) is available. In this manner, an entity controlling the network BOM server 124 (e.g., an IT business) can more easily deploy the computer network at the facility. Additionally, generation of the network BOM 134 enables such an entity to seek financing for devices listed in the network BOM 134 and present them to the user of the end-user device 132 to facilitate physical instantiation (e.g., installation) of the proposed computer network characterized in the network BOM 134. Further, in these situations, data in the network layout 168 can be employed by installation technicians to determine locations of WAPs throughout the facility.

Figure 6:
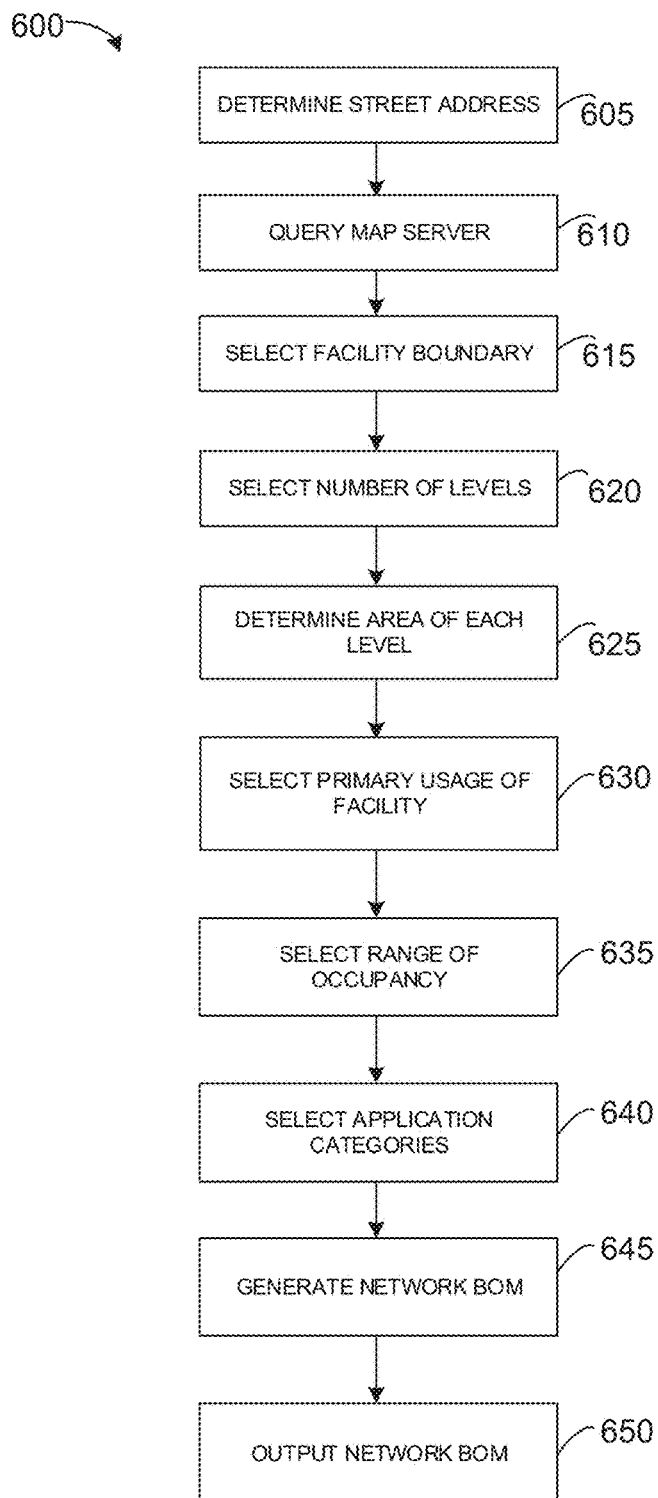
FIG. 6 illustrates a flowchart of an example method for generating a network BOM.
Figure 7:
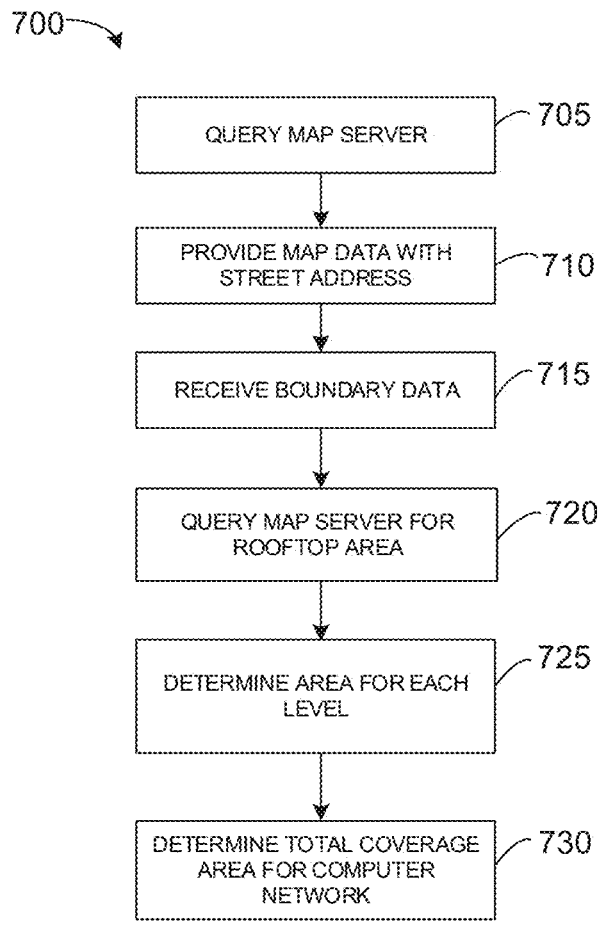
FIG. 7 illustrates a flowchart of an example method for determining an area of a computer network at a facility.
Figure 8:
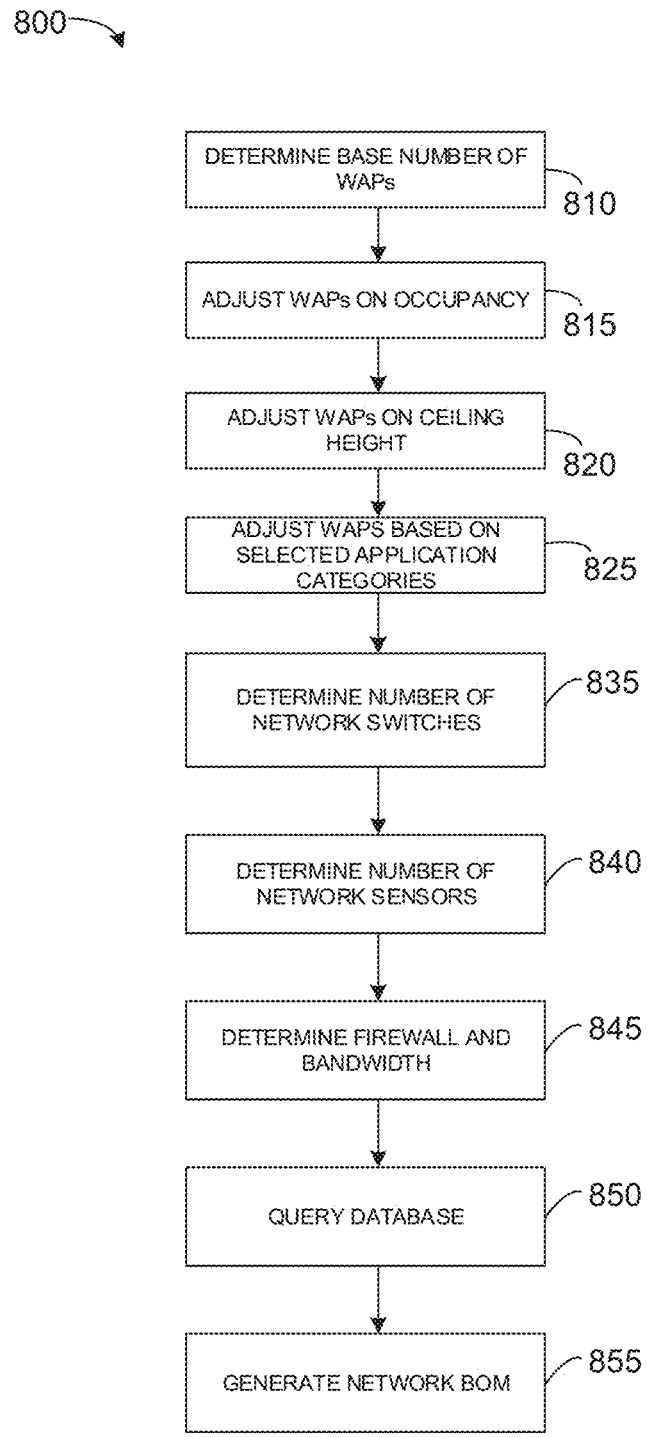
FIG. 8 Illustrates a flowchart of an example method for generating a network BOM.

In view of the foregoing structural and functional features described above, example methods will be better appreciated with reference to FIGS. 6-8. While, for purposes of simplicity of explanation, the example methods of FIG. 6-8 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates an example method 600 for providing information to facilitate the generation of a network BOM for a facility. The method 600 can be implemented, for example, with the system 100 of FIG. 1. Moreover, some operations in the method 600 can be executed by an end-user device (e.g., the end-user device 132 of FIG. 1) and other operations can be executed by a network BOM server, such as the network BOM server 124 of FIG. 1.

At 605, the network BOM server can determine an address of the facility. In some examples, to determine the address of the facility, the network BOM server receives location information from the end-user device. In some examples, the location information can include the address for the facility. In other examples, the location information can be latitude and longitude coordinates for the facility. In such a situation, to determine the street address for the facility the network BOM server can query a map server (e.g., the map server 150) for an address corresponding to the latitude and longitude coordinates.

At 610, the network BOM server can query the map server for map data that characterizes a map centered about the street address of the facility. This map data can be provided to the end-user device, and can be employed to output a map at a GUI (e.g., the GUI 136 of FIG. 1) of the end-user device. At 615, a boundary of the facility can be selected in response to user input. FIGS. 3A and 3B illustrate an example of a boundary selector provided for selection of a boundary of the facility and a boundary of levels within the facility. Facility boundary data characterizing the boundary of the facility can be provided to the network BOM server. Additionally, in some examples, level boundary data for boundaries of individual levels of the facility can also be provided to the network BOM server.

At 620, the GUI can be employed to select data characterizing the number of levels of the facility. In some examples, at 620, the GUI can be employed to adjust the size of one or more of the levels selected. The information characterizing the number of levels (and adjustments to individual levels) can be provided to the network BOM server. At 625, the network BOM server can determine an area of each of the levels of the facility. In some examples, the BOM server can query the map server for a rooftop area corresponding to the boundary selected for the facility and the number of levels for the facility as well as information characterizing the size of individual levels (if included).

At 630, the GUI can be employed to select a primary usage for the facility (e.g., residential, office, sporting events, festival, etc.). At 635, the GUI can be employed to select an expected occupancy range. At 640, the GUI can be employed to select categories of applications. Some of the operations at 605 (e.g., providing the facility address), 620 (selecting the number of levels), 630 (selecting the primary usage of the facility) and 635 (selecting a range of occupancy) and 640 (selection of application categories) can be implemented with a network menu, such as the network menu 200 of FIG. 2. Moreover, the information selected at 620, 630 and 635 can be provided to the network BOM server.

At 645, the network BOM server can generate a network BOM based on the area of the facility and on the information characterizing the use of the facility (e.g., the primary usage, the selected range of occupancy, the selected application categories, etc.). The network BOM can be provided to the end-user device. At 650, the GUI of the end-user device can output the network BOM. Additionally, in some examples, the GUI of the end-user device can output an interactive map with a WAP layout (e.g., as illustrated in FIGS. 5A and 5B) based on the network BOM that can be employed to update the network BOM.

FIG. 7 illustrates a flowchart of an example method 700 for calculating an area for a computer network for installation in a facility. The method 700 can be executed by a network BOM server, such as the network BOM server 124 of FIG. 1. In the method 700, it is presumed that the address of the facility has been determined, and the network BOM server has received information characterizing the number of levels of the facility.

At 705, the network BOM server queries a map server (e.g., the map server 150 of FIG. 1) for map data corresponding to a map centered about the address of the facility. At 710, the map data is provided to an end-user device (e.g., the end-user device 132 of FIG. 1). At 715, the network BOM server receives facility boundary data characterizing a boundary of the facility. In some examples, at 715, the network BOM server can also receive level boundary data characterizing a boundary of individual levels of the facility. At 720, the network BOM server can query the map server for a rooftop area corresponding to the boundary of the facility. In some examples at 720, the network BOM server can also query the map server for the area of individual levels of the boundary (defined in the level boundary).

At 725, the network BOM server can determine an area for each level of the facility. In some examples, the area of each level can be presumed to be the same as the rooftop area. In other examples, level boundary data from the end-user device can indicate that one or more levels has a different size, such that the area of individual levels can be adjusted. At 730, the network BOM server can add the area of each level together to derive the total area for the facility.

FIG. 8 illustrates a flowchart of an example method 800 for determining a network BOM for a facility. The method 800 can be executed by a network BOM server, such as the network BOM server 124 of FIG. 1. In the method 800, it is presumed that the area of the facility has been determined, and the network BOM server has received information characterizing the expected operations of the facility, including the selected primary usage of the facility, the expected occupancy, categories of applications, and information concerning Internet status, such as the information included in the network menu 200 of FIG. 2 or some subset thereof.

At 810, the network BOM server determines a based number of WAPs for the computer network based on the selected primary usage. At 815, the base number of WAPs are adjusted based on the selected occupancy range. At 820, the network BOM server can adjust the number of WAPs based on a ceiling height of the facility, which can correspond to the primary usage. At 825, the network BOM can adjust the number of WAPs based on the selected categories of applications. At 835, the BOM server can determine the number of switches needed for the computer network.

At 840, the network BOM server can determine a number of network sensors based on the determined number of WAPs. At 845, the network BOM server can determine if a firewall is needed and/or the Internet bandwidth needed for the computer network. At 850 the network BOM server can query a database (e.g., the network element database 160 of FIG. 1) for network components (e.g., specific WAP models, specific switches, specific firewalls, ISP contracts, software licensing, etc.) for the computer network. At 855, the network BOM server can aggregate the data provided from the database to generate the network BOM. The network BOM includes a list of elements (network components) for installing the computer network at the facility, with assurances that the performance of the resultant network will meet the needs specified at the network menu. The network BOM can be provided to the end-user device.

Specific details are given in the above description to provide a thorough understanding of the described examples. However, it is understood that the examples can be practiced without these specific details. For example, physical components can be shown in block diagrams in order not to obscure the examples in unnecessary detail. In other instances, well-known circuits, processes, algorithms, structures and techniques can be shown without unnecessary detail in order to avoid obscuring the examples.

Implementation of the techniques, blocks, steps and means described above can be done in various ways. For example, these techniques, blocks, steps and means can be implemented in hardware, software or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof. In one example, the network BOM server 124, the network element database 160 and/or the map server 150 of FIG. 1 can be implemented on one or more cloud servers and can be configured to receive feature sets for analysis from one or more client systems. Specifically, the network BOM server 124 and/or the network element database 160 can be implemented on a multi-tenant cloud services platform system such that multiple clients can log in to a central location to access a server or collection of servers, but where the specific access to data is restricted. For example, each client might be restricted from accessing data of other clients, and the multi-tenant cloud services platform system may keep track of how many resources (e.g., processor cycles, storage, or time spent using instances of cloud-hosted software applications) have been used by each of the clients, and bill the clients based on the resource usage.

Furthermore, embodiments can be implemented by hardware, software, scripting languages, firmware, middleware, microcode, hardware description languages and/or any combination thereof. When implemented in software, firmware, middleware, scripting language and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures and/or program statements. A code segment can be coupled to another code segment or a hardware circuit by passing and/or receiving information, data, arguments, parameters and/or memory contents. Information, arguments, parameters, data, etc. can be passed, forwarded, or transmitted via any suitable mechanism including memory sharing, message passing, ticket passing, network transmission, etc.

For a firmware and/or software implementation, the methodologies can be implemented with modules (e.g., procedures, functions and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and/or various other storage mediums capable of storing that contain or carry instruction(s) and/or data.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In view of the foregoing structural and functional description, those skilled in the art will appreciate that portions of the systems and method disclosed herein may be embodied as a method, data processing system or computer program product such as a non-transitory computer readable medium. Accordingly, these portions of the approach disclosed herein may take the form of an entirely hardware embodiment, an entirely software embodiment (e.g., in a non-transitory machine-readable medium) or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices and magnetic storage devices.

What have been described above are examples. It is, of course, not possible to describe every conceivable combination of structures, components, or methods, but one of ordinary skill in the art will recognize that many further combinations and permutations are possible. Accordingly, the disclosure is intended to embrace all such alterations, modifications and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions, the machine executable instructions comprising a graphical user interface (GUI) that:

provides data characterizing a location and expected operations of a facility for a computer network to a network bill of materials (BOM) server;

receives map data characterizing a geographic location of the facility;

determines a boundary of the facility based on the map data;

generates a boundary selector that enables selection of a portion of the boundary determined for the facility in response to user input and provides facility boundary data to the network BOM server characterizing the portion of the boundary of the facility, wherein the network BOM server queries a map server in response to receiving the facility boundary data to retrieve rooftop area for the portion of the boundary of the facility;

receives, from the network BOM server, a network BOM that lists wireless access points (WAPs) and network switches needed for installation of the computer network, wherein the network BOM server:

determines an average number of devices per occupant for communication via the computer network based on a selected usage of the facility; and computes a number of WAPs of the WAPs for the computer network based on the determined average number of devices, a selected expected occupancy range indicative of a number of users at one time that will use the computer network, and the retrieved rooftop area for the portion of the boundary of the facility; and outputs data characterizing the network BOM.

2. The medium of claim 1, wherein the GUI outputs a network menu that enables user input for data characterizing a location of the facility for the computer network.

3. The medium of claim 2, wherein the GUI provides a selectable primary usage of the facility and the selected expected occupancy range for the facility.

4. The medium of claim 2, wherein the GUI provides selection of a plurality of application categories for the computer network at the facility.

5. The medium of claim 2, wherein the GUI provides an option to list a number of levels of the facility that need access to the computer network.

6. The medium of claim 1, wherein the boundary selector further enables selection of a boundary for individual levels of the facility in response to user input and provides level boundary data to the network BOM server characterizing the boundary of an individual level of the facility that has a size variance relative to the boundary of the facility.

7. The medium of claim 1, wherein the GUI provides an interactive map for the facility that depicts proposed locations of WAPs in the facility, wherein the interactive map enables user input to change a location of the WAPs and a number of the WAPs in the facility.

8. A system comprising:
a non-transitory machine readable medium having machine executable instructions;
a processing unit that executes the machine readable instructions, the machine readable instructions comprising a network bill of materials (BOM) server that:
    receives data characterizing a location and expected operations of a facility for a computer network from an end-user device;
    provides map data to the end-user device characterizing a geographic location of the facility, wherein a boundary of the facility is determined based on the map data;
    receives facility boundary data characterizing a portion of the boundary of the facility that is provided from the end-user device in response to the map data;
    queries a map server in response to receiving the facility boundary data to retrieve rooftop area for the portion of the boundary of the facility;
    determines an average number of devices per occupant for communication via the computer network based on a selected usage of the facility;
    computes a number of wireless access points (WAPs) for the computer network based on the determined average number of devices, a selected expected occupancy range indicative of a number of users at one time that will use the computer network, and the retrieved rooftop area for the portion of the boundary of the facility;
    generates a network BOM based on the number of WAPs that lists the WAPs and network switches needed for installation of the computer network; and
    provides data characterizing the network BOM to the end user device.

9. The system of claim 8, wherein the expected operations of the facility characterizes a primary usage of the facility and the selected expected occupancy range of the facility.

10. The system of claim 8, wherein the expected operations of the facility includes a list of two or more application categories for the computer network.

11. The system of claim 8, wherein the network BOM server changes the area of a level of the facility in response to level boundary data provided from the end-user device that characterizes a boundary of a level of the facility.

12. The system of claim 8, wherein the network BOM server provides a network layout for an interactive map at the end-user device that proposes positions of the WAPs in the BOM throughout the facility.

13. A method for generating a bill of materials (BOM) for a computer network for a facility comprising:
receiving location information characterizing a location of a facility for a computer network;
providing map data characterizing a geographic location of the facility;
determining a boundary of the facility based on the map data;
receiving facility boundary data characterizing a portion of the boundary of the facility that is provided from an end-user device in response to the map data;
querying a map server in response to receiving the facility boundary data to retrieve rooftop area for the portion of the boundary of the facility;
determining a set of levels of the portion of the facility that need access to the computer network;
determining an area for each level of the set of levels to determine a total area of the portion of the facility based on the facility boundary data;
determining an average number of devices per occupant for communication via the computer network based on a selected usage;
calculating a number of wireless access points (WAPs) for the computer network needed to provide wireless access for devices for each level of the set number of levels based on the determined average number of devices, a selected expected occupancy range indicative of a number of users at one time that will use the computer network, and the retrieved rooftop area for the portion of the boundary of the facility;
determining a bandwidth needed for the computer network; and generating a BOM for the computer network based on the number of WAPs and the bandwidth, wherein the BOM for the computer network lists hardware components for instantiating the computer network.

14. The method of claim 13, wherein the location information comprises an address of the facility.

15. The method of claim 14, wherein determining the area for each level further comprises:
providing the map data to a graphical user interface (GUI) operating on the end-user device, wherein the map data enables the GUI of the end-user device to output a map for a geographic region that includes the address of the facility; and
receiving the facility boundary data provided in response to user input at the GUI.

16. The method of claim 15, further comprising:
transmitting BOM data that characterizes the BOM of the computer network to the GUI of the end-user device; and
transmitting network map data to the GUI of the end-user device based on the total area for each of the levels of the facility and the BOM of the computer network, wherein the network map data enables the GUI to output an interactive map of the facility with icons representing the WAPs.

17. The method of claim 13, wherein the interactive map provides user controls for moving icons representing the WAPs and changing the number of WAPs for each of the levels of the facility and the method further comprises updating the BOM of the computer network in response to a change in the number of WAPs at the interactive map.

18. The method of claim 13, further comprising determining a number of switches for the computer network based on the number of WAPs.

19. The method of claim 13, further comprising changing the area of one or more levels of the facility in response to data from the end-user device.

* * * * *